3,702,254
MULTILAYERED STARCH-CONTAINING
DESSERT
Robert R. Cassanelli, Yorktown Heights, Ronald P. Wauters, Vails Gate, and Anastasia C. Wirchansky, Yonkers, N.Y., and Clement R. Wyss, Park Ridge, N.J., assignors to General Foods Corporation, White Plains, N.Y.
No Drawing. Filed May 20, 1970, Ser. No. 39,854
Int. Cl. A23l 1/04, 1/14
U.S. Cl. 99—139                    6 Claims

ABSTRACT OF THE DISCLOSURE

A multilayered and multitextured pudding-like dessert is prepared from a shelf-stable, single package, powdery mix containing a gelatin-pregelatinized starch setting system and an emulsified fat system. When whipped with boiling water and diluted with milk or water, a multilayered dessert, having a pudding-like texture bottom and a creamy topping, is produced.

BACKGROUND OF THE INVENTION

This invention relates to powdered whippable dessert compositions for use in making differently textured, multilayered pudding-like desserts and to methods of preparing them. More particularly, this invention relates to multilayered desserts having a lower pudding-textured layer and an upper creamy aerated-fat layer; this invention also particularly relates to multilayered desserts having a lower pudding-like layer, a middle chiffon-like layer and an upper layer having a whipped creamy fat topping-like texture. The invention also relates to processes of preparing multilayered, multitextured pudding-like desserts from a single package powdery dessert mix.

Layered pudding desserts are desirable for their taste, aesthetic and decorative values. The culinary art, however, presently obtains such desserts by separate preparation of each desired layer. The pudding is made and set and then the successive layer or layers are then applied to the pudding layer. It would clearly save time, cost and effort if such a dessert could be prepared from a single mix and mixing operation.

SUMMARY OF THE INVENTION

It is a principal object of this invention to provide a single package dessert mix which will produce a two or three-layered, differently-textured pudding-like dessert upon hydration and whipping.

It is a further object of this invention to produce a multitextured, multilayered pudding dessert, (1) having a lower layer substantially of a pudding texture and an aerated creamy fat upper layer of a whipped topping texture or (2) having the former two layers with a middle layer of a chiffon-like texture.

Still further, it is an object of this invention to provide processes for preparing multilayered, multitextured pudding dessert mixes.

We have found that when a dry mix, comprising restricted portions of gelatin, pregelatinized starch, sugar and a fat portion in chip form or plated on sugar, is whipped with water and then blended with water or milk as described below, a differently-textured two or three-layered pudding-like dessert results.

Katz, U.S. Pat. 3,434,848, discloses at column 10 of the specification a food mix and process for obtaining a two-phase, fruit-flavored gelled dessert, comprising a pregelatinized starch and surfactant setting system where the surfactant is a blend of glyceryl and propylene glycol monostearates. Our invention, however, to produce a two or three-layered pudding dessert of superior taste and texture, utilizes a setting system of pregelatinized starch and gelatin to form the bottom pudding-like layer, and an emulsified fat system for forming the upper aerated layer. The Katz patent specifically states the object of keeping the fat and protein level to an absolute minimum, below 8% of the mix weight and preferably below 5%. The high quality of our dessert depends greatly on the presence of a greater amount of emulsified fat of the type to be described, and a lower level of pregelatinized starch.

Generally, the single package pudding dessert mix will contain sugar, gelatin, pregelatinized starch and a fat portion comprising edible fats and emulsifiers. Preferably, the mix may also contain non-fat milk solids to add to the creamy texture of the finished dessert. The mix may further contain gums, flavorings, dyes or colorings, lecithin, food acids, vitamins, minerals and so forth.

DESCRIPTION OF THE PREFERRED EMBODIMENT

In practicing our invention in a preferred manner, one part of the fat portion is mixed with about five parts of sugar. The mixture is then reduced to a homogeneous powder so that the fat is plated on the sugar particles. This fat-sugar admixture is then combined with the pregelatinized starch, gelatin, the remaining sugar, non-fat milk solids if desired and other ingredients to form the dessert mix. This is more free-flowing and soluble upon hydration by preparing the fat and sugar in this manner.

Alternatively, the dessert mix is prepared by mixing about 30% of the sugar and about two-thirds of the fat portion and reducing the mixture to a homogeneous powder. The remaining fat portion is added and the mixture is then treated so that the fat portion takes the form of chips. The fat-sugar chips are then mixed with the other ingredients as the fat-sugar particles were above.

The gelatin can be added separately to the mix or can be incorporated in it by mixing the gelatin and some of the sugar in hot water to form a slurry, and then spray-drying the slurry. This latter approach would aid the solubility of the gelatin when the dessert mix is hydrated. Any edible-grade gelatin, preferably grocery-grade gelatin, can be used.

The particular edible fats to be incorporated in the dessert composition according to this invention may be edible oils, such as coconut oil, etc., and semi-solid or solid fats, i.e., the usual shortenings.

In addition to the fat itself, if the fat is not preemulsified, the fat portion of the present composition can include one or more emulsifying agents for fat, such as lecithin and polyglycerol esters of fatty acids. Many more are known to those skilled in the art.

The fat portion should exhibit a plastic range after whipping with the gelatin-starch portion according to the recipe hereinafter described, such that it will melt readily at or about mouth temperature. More particularly, the fat portion should show a rapid decrease in solids content over a range between room temperature and body temperature. Thus, it is desirable that between 70° F. and 100° F. there be a sharp drop in the solids content index of the fat portion. The fat portion employed in this invention will preferably have a solids content of about 64.4 percent at 50° F., and a solids content of about 4.2 percent at 110° F. The Wiley melting point range of the fat portion is between about 99° F. and 120° F.

Any pregelatinized starch can be used such as potato starch, and preferably tapioca starch.

Suitable sugars for use in the invention include any of commonly used sugars, including sucrose, dextrose, maltose, fructose and lactose, as well as mixtures of these sugars or artificial sweeteners.

Each of the ingredients employed in the dessert mix of this invention has an important function in the making of a multitextured, multilayered pudding dessert.

Of course, sugar is the major sweetening agent. The edible fat or oil contributes to the whipping and formation of the upper layer as well as providing the proper texture, mouthfeel, flavor and appearance. Polyglycerol esters of fatty acids and lecithin are emulsifier combinations which, due to their affinity for water and fat, facilitate whipping and separation of the mixture into well-defined layers. The emulsifiers also control the rate, amount and type of the upper layer, and its texture. The pregelatinized starch and gelatin assist in setting the non-fat portion, and the starch contributes to the formation of the desired pudding-like texture and mouthfeel. The non-fat milk solids, while not essential, are preferably included in order to add to the creaminess of all layers of the dessert. Whey solids, dextrins and water binding carbohydrates could also be used for this purpose.

The range of ingredients used in the multi-layered, multi-textured pudding dessert mixes are given in the following example:

EXAMPLE I

| | Percent of total mix weight |
|---|---|
| Sugar | 40.0–85.0 |
| Gelatin-starch portion: | |
|   Non-fat milk solids | 0–30 |
|   Gelatin | 3.0–7.0 |
|   Pregelatinized starch | 1.0–7.0 |
|   Flavor | 0.2–4 |
|   Salt | 0.1–0.2 |
|   Coloring | 0.02–0.05 |
| Fat portion: | |
|   Hydrogenated vegetable oil | 6–13 |
|   Polyglycerol esters of fatty acids (diglycerol monostearate) | 0.2–3 |
|   Flavor | 0.03–0.1 |
|   Lecithin | 0.02–0.5 |

The fat, emulsifiers and flavors are heated to about 140° F. in a mixing tank. Next, about one part of the melted fat portion and about five parts of granulated sugar are simultaneously added to a liquid/solid continuous mixing device to form a fat/sugar paste. The resulting paste is then fed into a 5 roll refiner where it is crushed to a relatively dry fat, sugar powder, in which the fat is plated on the sugar. The fat/sugar powder is cooled to about 45° F., and then ground into a homogeneous mixture in a Fitz Mill. Next, the homogeneous fat/sugar powder is blended in a solids mixture with about one part of additional granulated sugar and the other ingredients above, and packaged for storage.

EXAMPLE II

The fats, emulsifiers and flavors of Example I are heated to about 140° F. in a mixing tank. Next, about one part of the melted fat portion is sprayed onto six parts of ground sugar in a ribbon mixer. Liquid carbon dioxide is passed through the mixture to cool it, and it is then ground into a homogeneous mixture in a Fitz Mill to plate the fat onto the sugar, blended with the remaining ingredients into a dry mix and packaged.

EXAMPLE III

The fats, emulsifiers and flavors of Example I are heated to about 140° F. in a mixing tank. About 30% of the sugar and about ⅔'s of the fat/emulsifier/flavor mix is then added to a Ribbon Mixer and blended thoroughly to form a paste. The resulting paste is then fed into a 5 roll refiner, whereupon the refined dry mix is placed in an emulsifier mixer with the remainder of the fat and blended at 130° F. for about three hours. The blended material is then fed into a chip depositor where separate fat chips are produced. These chips are then added to the remaining sugar and ingredients and the mix is packaged.

EXAMPLE IV

A dessert mix was prepared according to the process of Example I, containing the following ingredients:

EXAMPLE IV

| | Grams | Percent total weight |
|---|---|---|
| Sugar | 74.17 | 59.78 |
| Gelatin-starch portion: | | |
|   Non-fat milk solids | 25.0 | 20.15 |
|   Pregelatinized starch | 5.65 | 4.63 |
|   Gelatin | 5.4 | 4.35 |
|   Vanilla flavor | 0.27 | 0.22 |
|   Acetaldehyde | 0.20 | 0.16 |
|   Salt | 0.133 | 0.11 |
|   Coloring | 0.033 | 0.03 |
| Fat portion: | | |
|   Hydrogenated vegetable oil | 9.64 | 7.78 |
|   Polyglocerol esters of fatty acids (diglycerol monostearate) | 1.48 | 1.19 |
|   Vanilla flavor | 0.05 | 0.04 |
|   Lecithin | 0.04 | 0.03 |

One-half cup of boiling water is added to the mix and blended at low speed with an electric mixer for about 30 seconds in order to melt the fat portion, solubilize the gelatin and disperse the starch. The mixture is then whipped at medium to high seed for 3 minutes with an upright electric mixer or 4 minutes with a portable electric mixer or a rotary hand beater, lowering the temperature of the emulsion, solidifying and aerating the fats within the range for best whipping. The seed is reduced to low and 1¼ cups of cold milk is blended into the mixture, breaking the emulsion and allowing the fat and gelatin foam to rise to the surface. Additionally, the milk adds to the creaminess of the mixture and the taste of the end product. The mixture is poured into glasses and chilled until set. The mixture gradually separates into a two-layered vanilla-flavored dessert having a lower pudding-like layer, and an upper foamy creamy fat layer.

EXAMPLE V

The mix of Example IV is blended the same way, except that ¾ cup of boiling water is added initially instead of ½ cup and 1 cup of milk is blended in after whipping instead of 1¼ cups. A three-layered dessert results upon chilling having a middle chiffon-like layer between the pudding layer and the foamy upper layer.

EXAMPLE VI

A three-layered pudding dessert was prepared using the process of Example I and a mix with the following composition:

| | Grams | Percent total weight |
|---|---|---|
| Sugar | 101.16 | 79.47 |
| Gelatin-starch portion: | | |
|   Pregelatinized starch | 2.43 | 1.91 |
|   Gelatin | 7.54 | 5.92 |
|   Vanilla flavor | 0.40 | 0.31 |
|   Acetaldehyde | 0.30 | 0.24 |
|   Salt | 0.20 | 0.16 |
|   Coloring | 0.05 | 0.04 |
| Fat portion: | | |
|   Hydrogenated vegetable oil | 13.1 | 10.3 |
|   Polyglcerol esters of fatty acids (diglycerol monostearate) | 2.01 | 1.58 |
|   Vanilla flavor | 0.06 | 0.05 |
|   Lecithin | 0.06 | 0.04 |

Two-thirds cup of boiling water is added to the above dry mix and blended at the low speed of an electric mixer for 30 seconds. The blend is then whipped at high speed for 3 minutes with an upright electric mixer or 4 minutes with a portable electric mixer. Reducing the speed to low, 1 cup of cold milk is added and blended. The mixture is poured into glasses and chilled until set.

The composition recited in Example I will tend to yield a three-layered dessert by using a low level of starch or by increasing the initial amount of boiling water added to the dry mix while decreasing the amount of cold milk added later by an identical amount. As the starch level is increased, the dessert will tend to become two-layered.

Many known dessert ingredients and food additives may be employed in the dessert mix of our invention without departing from its scope, such as various flavors, colorings, salts and so forth. Fat soluble colorings can be added to give the dessert differently-colored layers upon separation.

It is to be understood to those skilled in the art that many changes, embodiments and applications can be made without departing from the scope of this invention. Thus, the disclosure and description herein are merely illustrative and not intended to be limiting in any manner.

What we claim is:

1. A dry whippable composition for preparing a multi-textured, multilayered pudding-like dessert comprising 3% to 7% gelatin, 1% to 7% pregelatinized starch, 6% to 13% fat, 0.2% to 3.5% emulsifier, and 40% to 85% sugar, said percentages being percentages of the total weight of said composition.

2. The composition of claim 1 where the fat is emulsified.

3. The composition of claim 1 where the fat is plated on the sugar.

4. The composition of claim 1 where the fat is combined with the sugar in chip form.

5. The composition of claim 1 further comprising non-fat milk solids in amounts up to 30% of the total weight of said composition.

6. A process for preparing a multilayered, multitextured pudding-like dessert, comprising adding 4 to 6 fluid ounces of boiling water to 120 to 140 grams of a dry whippable composition comprising by weight 3% to 7% gelatin, 1% to 7% pregelatinzed starch, 7% to 12% fat, 0.2% to 3.5% emulsifier, and 40% to 85% sugar, blending the mixture for about 30 seconds with an electric mixer or rotary hand beater, whipping the mixture at medium to high speed for about 3 minutes with an upright electric mixer or about 4 minutes with a portable electric mixer or rotary hand beater, blending into the mixture 8 to 12 fluid ounces of cold milk or cold water at low speed with an electric mixer or rotary hand beater, and chilling the mixture.

References Cited

UNITED STATES PATENTS 3,579,355  5/1971  Wyss et al. _____ 99—139 X
3,434,848  3/1969  Katz _____ 99—139

OTHER REFERENCES

Knox Gelatine, Spanish Cream or Molded Custard, 1927, p. 24.

RAYMOND N. JONES, Primary Examiner

J. M. HUNTER, Assistant Examiner

U.S. Cl. X.R.

99—130

UNITED STATES PATENT OFFICE
CERTIFICATE OF CORRECTION

Patent No. 3,702,254    Dated November 7, 1972

Inventor(s) Robert R. Cassanelli, Ronald P. Wauters, Anastasia C. Wirchansky and Clement R. Wyss It is certified that error appears in the above-identified patent and that said Letters Patent are hereby corrected as shown below:

Column 4, line 7, "EXAMPLE IV" should be omitted;

Column 4, line 10, under the heading "Percent total weight", -- 59.78 -- (for "Sugar") should be inserted;

Column 4, line 11, "59.78" (for "Gelatin-starch portion:") should be omitted;

Column 4, line 25, "seed" should read -- speed --;

Column 4, line 55, under the heading "Percent total weight", -- 79.47 -- (for "Sugar") should be inserted;

Column 4, line 56, "79.47" (for "Gelatin-starch portion:") should be omitted.

Signed and sealed this 22nd day of May 1973.

(SEAL)
Attest:

EDWARD M. FLETCHER JR.
Attesting Officer

ROBERT GOTTSCHALK
Commissioner of Patents